Figure 1:
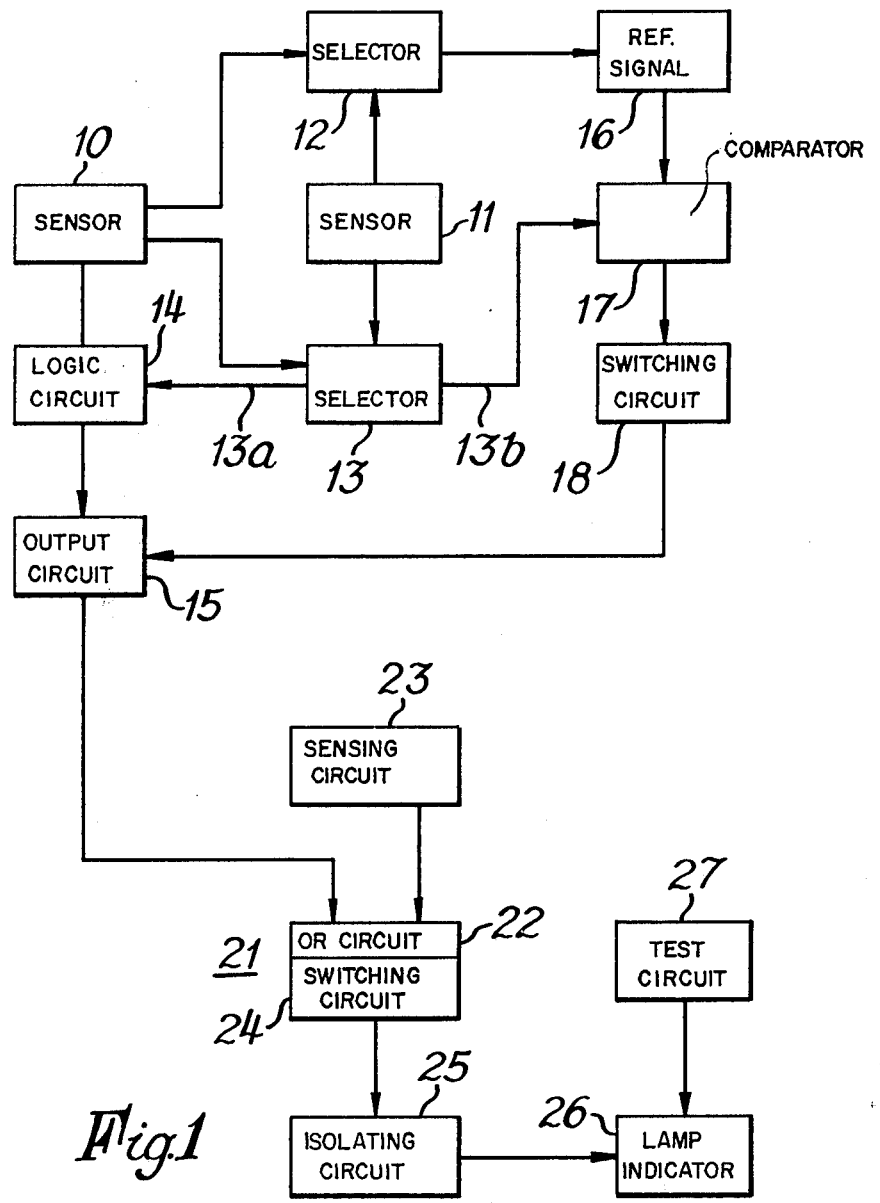

United States Patent [19]
Taylor et al.

[11] 3,966,265
[45] June 29, 1976

[54] FAULT DETECTING SYSTEM FOR VEHICLE ANTI-SKID CONTROL SYSTEMS

[75] Inventors: Robert Ernest Taylor; Mervyn Brian Packer; David Parsons, all of Leamington Spa, England

[73] Assignee: Automotive Products Ltd., Leamington Spa, England

[22] Filed: Sept. 3, 1974

[21] Appl. No.: 502,854

[30] Foreign Application Priority Data
Sept. 14, 1973 United Kingdom............... 43301/73

[52] U.S. Cl. .......................... 303/21 AF; 340/52 B
[51] Int. Cl.$^2$ .......................................... B60T 8/08
[58] Field of Search.................. 188/181 C; 303/21; 307/10 R; 317/5; 324/161; 340/52 B, 53, 263

[56] References Cited
UNITED STATES PATENTS

| | | | |
|---|---|---|---|
| 2,927,302 | 3/1960 | Steigerwald...................... | 340/52 B |
| 3,516,715 | 6/1970 | Fielek, Jr. et al............... | 303/21 AF |
| 3,606,491 | 9/1971 | Walsh............................ | 303/21 AF |
| 3,706,971 | 12/1972 | Okamoto et al. ................. | 340/52 B |
| 3,744,851 | 7/1973 | Burckhardt et al......... | 303/21 AF X |
| 3,759,582 | 9/1973 | Ohta et al...................... | 303/21 AF |
| 3,861,755 | 1/1975 | Taylor............................ | 303/21 AF |
| 3,866,979 | 2/1975 | Rabus et al..................... | 303/21 AF |

Primary Examiner—Duane A. Reger
Attorney, Agent, or Firm—Lawrence J. Winter

[57] ABSTRACT

A fluid pressure operated braking system of the kind which includes an electrical system which is associated with wheels of the vehicle and arranged to regulate the braking force applied to the associated wheels, and which is operable automatically to effect release of a brake acting on the associated wheels when the deceleration thereof exceeds a predetermined amount and to re-apply the brake when the angular velocity of the respective wheels approaches that at which the periphery of the wheel rolls on the road surface without slipping. The system senses the time for which the brake is released and if the sensed time is greater than a predetermined time, the electrical system is rendered inoperative to permit re-application of the brake.

6 Claims, 2 Drawing Figures

FAULT DETECTING SYSTEM FOR VEHICLE ANTI-SKID CONTROL SYSTEMS

This invention relates to fluid pressure operated braking systems for vehicles. The fluid pressure operated braking systems are of the kind which include at least one electrical system associated with a wheel or group of wheels of the vehicle and arranged to regulate the braking force applied to the associated wheel or wheels, the or each electrical system being operable automatically to effect release of a brake or brakes acting on the associated wheel or wheels when the deceleration thereof exceeds a predetermined amount and to re-apply the brake or brakes when the angular velocity of the respective wheel approaches that at which the periphery of the wheel rolls on the road surface without slipping.

If a fault occurs in one or more of the electrical systems the brakes may be held released when they should be re-applied. This situation is clearly unsatisfactory since the brakes may be held permanently released.

According to the present invention there is provided a fluid pressure operated braking system of the kind referred to wherein the time for which a brake or brakes are released is sensed and if the sensed time is greater than a predetermined time, one or more of the at least one electrical system is rendered inoperative to permit re-application of the brake or brakes associated with said one or more electrical systems. Preferably the predetermined time is selected to be substantially longer than the time for which the brake or brakes are released in response to normal operation of the at least one electrical system.

In such a system the aim is to re-apply the brakes when there is maximum or near maximum grip between the periphery of the wheel and the road surface. Normally such a condition occurs when the wheel speed is slightly below the vehicle speed (typically 10% to 20% below the vehicle speed). In this specification reference to the angular velocity of a wheel approaching that at which the periphery of the wheel rolls on the road surface without slipping means an angular velocity at which the grip between the periphery of the wheel and the road surface is a maximum or near maximum.

Preferably the braking system includes a wheel speed comparison arrangement in which a signal indicative of the angular velocity of the or each said wheel is monitored, a reference signal related to the speed of the vehicle is produced, the signal indicative of the angular velocity of the or each said wheel is compared with the reference signal, and, if the magnitude of the reference signal exceeds the magnitude of the signal indicative of the annular velocity of one or more of said wheels by more than a predetermined amount, operation of the electrical system associated with the one or more of said wheels is modified so that the brake or brakes regulated thereby are released and not re-applied, the arrangement being such that the electrical system continues to operate normally to release and re-apply the brake or brakes to the associated wheel or wheels whilst the magnitude of the signal indicative of the angular velocity of said one or more of said wheels is greater than the reference signal less said predetermined amount.

The time for which the brakes are released may be sensed by an electronic circuit. The electronic circuit may include an input stage which is arranged to receive a first signal when the brakes are applied and a second signal when the brakes are released and to generate an output signal when said second signal has been fed to the input stage for said predetermined time. The input stage may include a resistor-capacitor arrangement having a time constant which corresponds to said predetermined time.

The electronic circuit may also include a switching stage which is connected to receive the output signal of said input stage, the switching stage being arranged to switch from a first condition to a second condition in response to said output signal and thereby disconnect the supply of electrical energy from the at least one electrical system. The switching stage may include a relay having a pair of normally closed contacts connected in an electrical energy supply line to said electrical system, said normally closed contacts being arranged to be opened when said switching stage switches from said first to said second condition.

The relay of the switching stage may have a pair of normally open contacts connected in series with a source of electrical energy and a lamp suitably positioned so as to be visible to the driver of the vehicle, said normally open contacts being arranged to be closed when said switching stage switches from said first to said second condition to thereby complete a circuit between the lamp and the electrical energy source and effect illumination of lamp. The driver of the vehicle is thus provided with a visible indication of a fault in the electrical system.

The electronic circuit may be provided with a lamp test stage, the lamp test stage being operable when the ignition of the vehicle is switched on to illuminate the lamp for a predetermined time.

The electronic circuit may have a plurality of input stages, each input stage being adapted to receive signals from a respective one of a plurality of electrical systems. Each input stage may be connected to a common switching stage such that, if any of the brakes associated with any one of the electrical systems are released for a time greater than said predetermined time, supply of electrical energy to all said electrical systems is disconnected.

Alternatively each input stage may be associated with its own switching stage such that the supply of electrical energy is disconnected only from those electrical systems which are associated with input stages that generate output signal.

Figure 2:
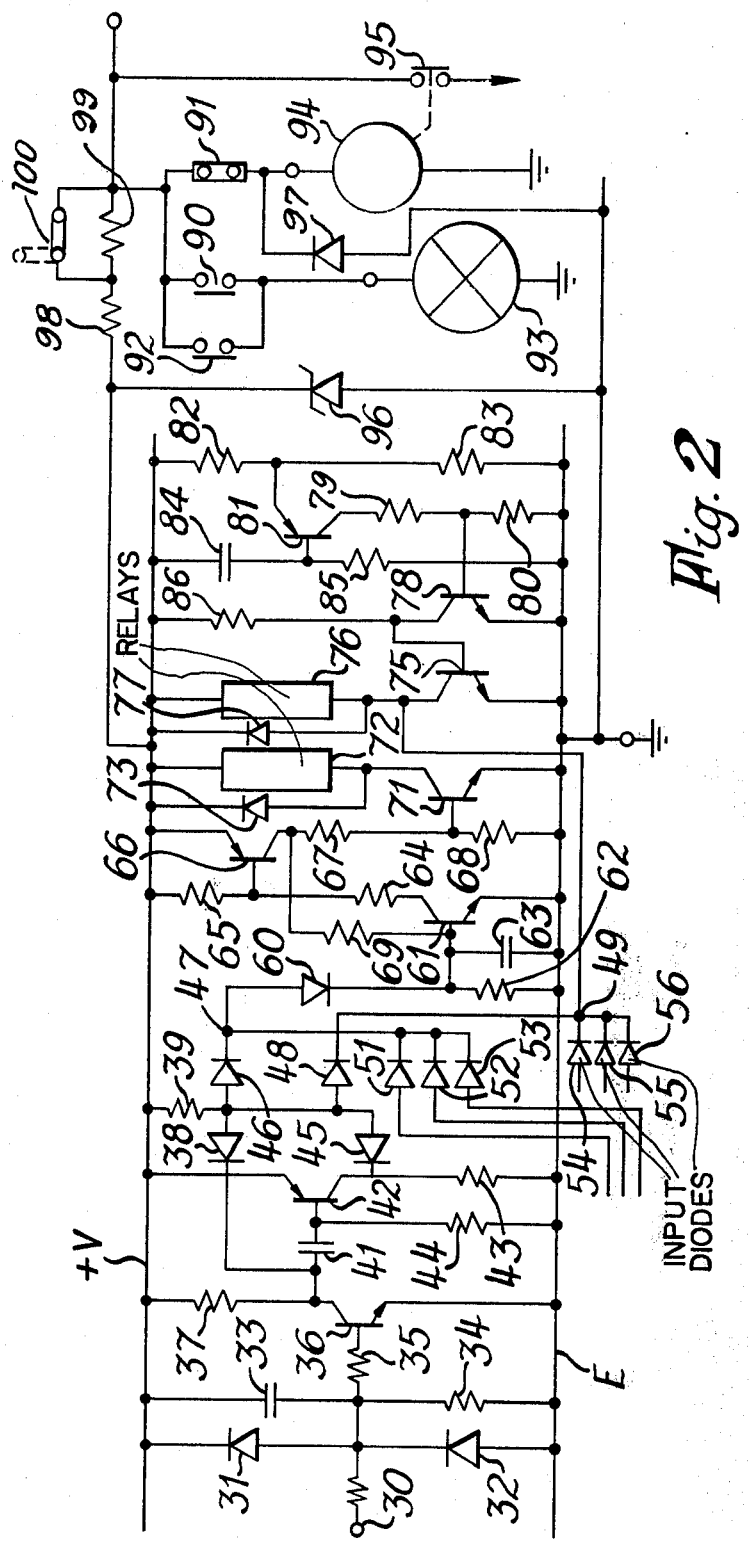

One embodiment of this invention will be described now by way of example only with reference to the accompanying drawings of which:

FIG. 1 is a block schematic diagram of a braking system in accordance with the present invention; and FIG. 2 is a circuit diagram showing in more detail some of the circuits shown as blocks in FIG. 1.

Referring to FIG. 1 of the drawings, a fluid pressure operated braking system for a vehicle includes a first electrical circuit 10 and a second electrical circuit 11. Each electrical circuit 10, 11 includes a wheel speed sensor. The electrical circuit 10 is arranged to generate an output signal, the magnitude of which is indicative of the speed of one of a pair of wheels which are mounted on a common axle of the vehicle. The electrical circuit 11 is arranged to generate an output signal, the magnitude of which is indicative of the speed of the other wheel of said pair. Suitable circuits 10, 11 are well known and will not be described in detail.

The output of electrical circuit 10 is connected in parallel to one input of each of two selector circuits 12 and 13. The output of electrical circuit 11 is connected in parallel to another input of each of said two selector circuits 12 and 13. The selector circuit 12 is arranged to compare the magnitude of the output signal of electrical circuit 10 with the magnitude of the output signal of electrical circuit 11 and to pass the larger of the two output signals to its output.

The selector circuit 13 is arranged to compare the magnitude of the output signal of electrical circuit 10 with the magnitude of the output signal of electrical circuit 11 and to pass the smaller of the two output signals to each of its outputs 13a and 13b.

The output 13a of selector circuit 13 is connected to the input of acceleration logic circuit 14 such that the acceleration logic circuit receives as an input signal the signal indicative of the speed of said slower wheel. The acceleration logic circuit 14 is arranged to compute from the wheel speed signal it receives the acceleration or deceleration of said slower wheel and to produce an output signal only when the computed deceleration exceeds a predetermined magnitude. The output of acceleration logic circuit 14 is connected to the input of output circuit 15.

The output of selector circuit 12 is connected to the input of a reference signal generating circuit 16 which, together with a comparator circuit 17 and a switching circuit 18, constitutes a wheel speed comparison circuit. The output of reference signal generating circuit 16 is connected to one input of the comparator circuit 17, a second input of which is connected to output 13b of selector circuit 13. The output of comparator circuit 17 is connected to the input of switching circuit 18 and the output of switching circuit 18 is connected to the output circuit 15.

The reference signal generating circuit 16 is arranged to generate a reference signal RS which is derived from the input signal it receives from selector circuit 12. The reference signal RS is fed to comparator circuit 17 which compares the reference signal RS with the output signal LS from selector circuit 13. The comparator circuit 17 is arranged to produce an output signal when the reference signal RS exceeds the output signal LS by a predetermined amount or more. The output signal of the comparator circuit 17 is fed to the input of switching circuit 18 which normally does not produce an output signal. If the comparator circuit 17 produces an output signal for a first predetermined time the switching circuit 18 switches states and produces an output signal which is fed to output circuit 15. When the comparator circuit 17 ceases to produce an output signal, the switching circuit 18 ceases to produce an output signal without delay.

The output signal 15 is connected to a solenoid operated control valve (not shown), the arrangement being such that the coil of the solenoid operated control valve is energised whenever a signal is fed from either or both of the acceleration logic circuit 14 and switching circuit 18 to the output circuit 15.

The solenoid operated control valve is arranged in a fluid supply line between a source of fluid pressure and motor cylinders of the brakes of the pair of wheels. If the coil of the solenoid is deenergized fluid pressure can be transmitted from the source of fluid pressure to the motor cylinders to cause application of the brakes of the vehicle. If the coil of the solenoid is energised fluid pressure acting in the motor cylinders is relieved so that the applied braking pressure is reduced.

In operation when the driver of the vehicle operates the brake pedal, fluid pressure is transmitted to the motor cylinders to cause application of the brakes. If during braking the deceleration of the slower of the pair of wheels on the common axle exceeds the appropriate predetermined amount, the acceleration logic circuit 14 produces an output signal and the coil of the solenoid operated control valve is energized. The pressure in the motor cylinders of the brakes of both wheels on the common axle is relieved so that the applied braking pressure is reduced. The pair of wheels accelerate. When the slower wheel attains a given speed or acceleration computed by the acceleration logic circuit 14, the acceleration logic circuit ceases to produce an output signal. The given speed or acceleration is so computed that, allowing for delays between cessation of the output signal and the actual re-application of the brakes caused by the inertia and compressibility of the mechanical components and operating fluid of the braking system, the brakes are re-applied at a time when the wheels have reached a speed at which there is a maximum or near maximum grip between the periphery of the wheel and the road surface on which it is rolling.

Normally cessation of an output signal from the acceleration logic circuit 14 results in de-energization of the coil of the solenoid operated control valve so that the brakes are re-applied. However, if the reference signal RS exceeds the signal LS by the appropriate predetermined amount and this condition has existed for the first predetermined time, the switching circuit 18 produces an output signal. The coil of the solenoid operated control valve will thus remain energised after cessation of an output signal from the acceleration logic circuit 14 and the brakes will be held released.

As soon as the difference between the reference signal RS and output signal LS is less than the appropriate predetermined amount, the switching circuit 18 will cease to produce an output signal and the brakes will be re-applied.

It will be noted that in the arrangement described above a wheel speed sensor is provided for each of the pair of wheels on the common axle whilst a single solenoid operated control valve controls the braking of both wheels equally and simultaneously.

The braking system has a fault detection circuit 21. The fault detection circuit 21 has an OR circuit 22 with two input terminals. A first of said terminals is connected to the output circuit 15 such that the OR circuit 22 receives an input signal whenever either or both of the acceleration logic circuit 14 and the switching circuit 18 are producing an output signal i.e. whenever the coil of the solenoid operated control valve is energised for brake release. A second of said input terminals is connected to a solenoid position sensing circuit 23. The sensing circuit 23 is arranged to sense the position of the armature of the solenoid and to produce an output signal when the armature is in a position in which the solenoid operated control valve causes release of brake pressure.

The OR circuit 22 produces an output signal when it receives an input signal at either of its input terminals. The output of the OR circuit 22 is connected to the input of a switching circuit 24. The switching circuit 24 is arranged to produce an output signal only when the OR circuit 22 produces an output signal continuously for a second predetermined time. The output of switching circuit 24 is connected to an isolating circuit 25. The isolating circuit 25 is arranged to disconnect the supply of electrical energy from the acceleration logic circuit 14 and the wheel speed comparison circuit whenever the switching circuit 24 produces an output signal. Whenever said supply of electrical energy is disconnected neither the acceleration logic circuit 14 nor the switching circuit 18 can produce output signals. Thus no signal is applied to energise the coil of the solenoid operated valve.

In operation if the driver of the vehicle applies the brakes and the deceleration of one of said pair of wheels exceeds the appropriate predetermined amount the coil of the solenoid operated control valve is energised and the brakes released as described above. Under normal operating conditions the time for which the coil is energised, i.e. the time for which the brakes are held released, is less than the second predetermined time for which the switching circuit 24 requires an input signal before producing an output signal. Thus under normal operating conditions the switching circuit 24 does not produce an output signal to cause disconnection of the supply of electrical energy from the acceleration logic circuit 14 and wheel speed comparison circuit.

If a fault occurs in one of the wheel speed sensors, the signal produced by the corresponding circuit 10 or 11 is not indicative of the speed of the corresponding wheel. The reference signal RS fed to comparator circuit 17 exceeds the signal LS by more than said predetermined amount. After said first predetermined time the switching circuit 24 produces an output signal and the coil of the solenoid operated control valve is energised for brake release. In the absence of the fault detection circuit the switching circuit 18 produces an output continuously and the brakes are held released permanently.

The fault detection circuit allows this situation to be avoided. When the switching circuit 18 has produced an output signal for said second predetermined period of time the switching circuit 24 produces an output signal. Isolating circuit 25 disconnects the supply of electrical energy from the wheel speed comparison circuit and switching circuit 18 ceases to produce an output signal. Thus the coil of the solenoid operated control valve is deenergised and the brakes can be re-applied. Once the isolating circuit 25 has disconnected the supply of electrical energy to the said circuits, the supply can be restored only after first switching off the ignition of the vehicle.

The isolating circuit 25 is connected to an indicating arrangement 26. The indicating arrangement 26 includes a lamp which is positioned so as to be visible to the driver of the vehicle. If the supply of electrical energy is cut off by isolating circuit 25, the lamp of the indicating arrangement 26 is illuminated to alert the driver of a fault.

The indicating arrangement 26 is connected to a testing circuit 27. The testing circuit 27 is arranged to be energized for a predetermined time when the ignition of the vehicle is switched on, energization of the testing circuit 27 causing the lamp of the indicating arrangement 26 to be illuminated. This arrangement provides a test that the lamp is operating correctly.

The lamp of the indicating arrangement 26 is also illuminated if the armature of the solenoid operated valve sticks in the open position. If this situation occurs sensing circuit 23 produces an output signal for a time longer than said second predetermined time. Thus switching circuit 24 produces an output signal and the supply of electrical energy to the acceleration logic circuit 14 and the wheel speed comparison circuit is disconnected. The lamp of the indicating arrangement 26 is illuminated to provide the driver with an indication that a fault has occurred.

The circuits 21, 26 and 27 will now be described in more detail. Referring to FIG. 2 the circuit 21 has an input terminal 30 which is connected to the output circuit 15 via a microswitch (not shown) which is arranged to be actuated by the armature of the solenoid operated control valve. The arrangement is such that when the coil of the solenoid operated control valve is de-energised the contacts of the microswitch are closed and a signal is applied to terminal 30. When the coil of the solenoid valve is energised for brake release the contacts of the microswitch are open and no signal is applied to terminal 30.

Terminal 30 is connected to the common junction of diodes 31, 32 which are connected between supply line +V and earth line E, and of capacitor 33 and resistor 34 which also are connected between line +V and line E. The common junction is connected by resistor 35 to the base of the transistor 36. The emitter of transistor 36 is connected directly to earth line E and the collector thereof is connected to line +V by resistor 37 and by diode 38 and resistor 39 connected in parallel with resistor 37. The collector of transistor 36 is also connected by capacitor 41 to the base of transistor 42. The emitter of transistor 42 is connected directly to line +V, the collector thereof to line E by resistor 43, and the base thereof to line E by resistor 44. The collector of transistor 42 is also connected by diode 45 to the junction of resistor 39 and diode 38. Transistors 36 and 42 and their associated components from an input stage, the output of which is fed via diode 46 to junction 47 and via diode 48 to junction 49. One input stage is shown in detail in FIG. 2 and this input stage is associated with a single solenoid operated control valve. The circuit also includes three other input stages (not shown) identical to the one illustrated in FIG. 2. The outputs of the three other input stages are connected via diodes 51, 52, 53 to junction 47 and via diodes 54, 55, 56 to junction 49.

The junction 47 is connected by diode 60 to the base of transistor 61 which is connected to earth line E by parallel arrangement of resistor 62 and capacitor 63. The emitter of transistor 61 is connected directly to earth and the collector thereof is connected by resistors 64, 65 to line +V. The junction of resistors 64, 65 is connected to the base of transistor 66, the emitter of which is connected directly to line +V. The collector of transistor 66 is connected to earth line E by resistors 67, 68 and to the base of transistor 61 by resistor 69 to provide a positive feedback connection. The junction of resistors 67 and 68 is connected to the base of transistor 71, the collector circuit of which includes a relay coil 72 connected in parallel with diode 73. Transistors 61, 66, 71 and relay 72 constitute a switching stage which is switched in response to a signal from any one of the input stages.

The junction 49 is connected to the collector of transistor 75, the collector circuit of which includes a relay coil 76 connected in parallel with diode 77. The base of transistor 75 receives the signal from the collector of transistor 78, the base of which is connected to the junction of resistors 79 and 80. The collector of the transistor 78 is connected by resistor 86 to the line +V and the emitter is connected directly to the earth line E. Resistors 79 and 80 connect the collector of transistor 81 to earth line E. The emitter of transistor 81 is connected to the junction of resistors 82 and 83 and the base is connected to the junction of capacitor 84 and resistor 85 which are connected in series between the positive line +V and earth line E.

Relay 72 has contacts 90 which are open when the relay coil is de-energised and contacts 91 are closed when the coil is de-energised. Contacts 90 are connected in parallel with contacts 92 of relay 76, the contacts 92 being open when the coil of relay 76 is not energised. The parallel arrangement of contacts 90, 92 is connected in series with a lamp 93 and line +V such that when either of contacts 90, 92 is closed the lamp is illuminated. The normally closed contacts 91 are connected in series with relay coil 94 which is connected in parallel with a diode 97. The arrangement is such that when the contacts 91 are opened the coil of relay 94 is deenergised. When the coil of relay 94 is de-energised its contacts 95 are opened. The contacts 95 are arranged in the line connecting the acceleration logic circuit 14 and wheel speed comparison circuit to a supply of electrical energy. Thus when contacts 95 open the supply of electrical energy to said circuits is disconnected.

A zener diode 96 is connected between the lines +V, E to stabilise the power supply. Resistors 98 and 99 are connected in the positive line +V and a removable link 100 is connected in parallel with the resistor 99. This arrangement allows different operating voltages to be obtained.

In use when the brakes of the vehicle are not applied a signal is applied to input terminal 30, and transistor 36 is conductive, the collector of transistor 36 being effectively at earth potential. Diode 38 is conductive and thus the junction of diodes 38, 46 and resistor 39, are at a low potential. The transistor 61 is non-conductive, transistors 66, 71 are also non-conductive and relay coil 72 is not energised.

If the brakes of the vehicle are applied and then released by the solenoid control valve or if a fault occurs in the braking system a signal is no longer applied to input terminal 30 and transistor 36 becomes non-conductive. The potential at the collector of transistor 36 rises rapidly and transistor 42 which is normally conductive becomes non-conductive. At this time the junction of diodes 38, 46 and resistor 39 is still at a relatively low potential since the resistance of resistor 43 is small compared with that of resistor 39. Thus transistors 61, 66 and 71 are still nonconductive.

If no signal is fed to input terminal 30, capacitor 41 begins to discharge through resistor 44. After a predetermined time (determined by the time constant of capacitor 41 and resistor 44) transistor 42 becomes conductive and the potential at the collector thereof rises. Diodes 45 and 38 are reverse biassed and the potential at the base of transistor 61 rises rendering transistor 61 conductive. Capacitor 63 and resistor 62 are provided to suppress voltage spikes. When transistor 61 becomes conductive, transistors 66 and 71 are also rendered conductive and thus relay coil 72 is energised. Thus relay contacts 90 close and current is supplied to illuminate lamp 93. Also relay contacts 91 are open to de-energise relay coil 94 thereby opening contacts 95 to cut-off power to the circuits controlling the solenoid operated control valve. The resistor 69 provides a positive feedback between the collector of transistors 66 and the base of transistor 61 and ensures that when transistor 66 is rendered conductive transistor 61 remains conductive and only becomes non-conductive again when the power to the circuit is switched off via the vehicle ignition.

Diodes 31 and 32 are provided to suppress voltage spikes when the contacts of the microswitch open or close. The capacitor 33 is provided to allow the components to reach their normal operating state at ignition switch-on. When the ignition is switched on and power applied to the circuits the potential at the junction of diodes 38, 46 and resistor 39 is effectively at earth potential and transistors 61, 66, 71 are nonconductive. If at this time terminal 30 is not receiving an input signal capacitor 33 discharges through resistor 34 and therefore provides a time delay before transistor 36 becomes non-conductive.

The lamp test stage of the circuit operates at ignition switch-on and is provided to test the operation of lamp 93. When the ignition is switched on and power applied to the circuit, the potential at the base of transistor 81 becomes substantially +V and transistor 81 is non-conductive. Transistor 78 is non-conductive and transistor 75 conductive so that relay coil 76 is energised. Contacts 92 are thus closed and current is supplied to illuminate lamp 93. Capacitor 84 begins to discharge through resistor 85 and after a pedetermined time transistor 81 becomes conductive. Transistor 78 is rendered conductive and transistor 75 becomes non-conductive thus de-energising relay coil 76 and disconnecting the supply of current from the lamp 93.

It will be noted that at ignition switch-on as transistor 75 is conductive, the collector thereof is effectively at earth potential and thus the junction of diode 38, 46 and resistor 39 is effectively earthed. This arrangement assists the capacitor 33 and resistor 34 arrangement is suppressing spurious operation of the circuit at ignition switch-on.

We claim:

1. A fluid pressure operated braking system comprising fluid carrying lines for supplying fluid under pressure to a brake of a vehicle, at least one electrical system operatively connected with a wheel of the vehicle to regulate the braking force applied to said wheel, said electrical system being operable automatically to effect release of said brake acting on said wheel when the deceleration thereof exceeds a predetermined amount and to re-apply said brake when the angular velocity of said wheel approaches that at which the periphery of said wheel rolls on the road surface without slipping, means for sensing the time for which said brake is released and operative, if the sensed time is greater than a predetermined time, to actuate an isolating circuit which renders inoperative said electrical system to permit re-application of said brake, said electrical system being rendered operative again when the ignition of the vehicle is switched off, a solenoid operated valve having an armature operatively connected with said electrical system and connected in the fluid lines of the braking system, said solenoid valve being operable in response to signals produced by said electrical system to relieve fluid pressure in a fluid line to thereby effect said brake release, means for sensing the position of the armature of said solenoid valve, said sensing means being connected to said isolating circuit and being operable to actuate said isolating circuit when said solenoid valve remains in a condition to relieve fluid pressure for more than a predetermined time.

2. A fluid pressure operated braking system according to claim 1 wherein the isolating circuit includes a switch which is opened after said predetermined time to disconnect a supply of electrical energy from said electrical system.

3. A fluid pressure operated braking system according to claim 2 wherein said switch is a relay contact.

4. A fluid pressure operated braking system according to claim 3 including an indicating arrangement having a warning device positioned in the vicinity of a driver of the vehicle, said warning device being energized when said electrical system is rendered inoperative, and a testing circuit which is actuated automatically when the ignition of the vehicle is switched on to energize the warning device for a predetermined period of time.

5. A fluid pressure operated braking system comprising fluid carrying lines for supplying fluid under pressure to a brake of a vehicle, at least one electrical system operatively connected with a wheel of the vehicle to regulate the braking force applied to said wheel, said electrical system being operable automatically to effect release of said brake acting on said wheel when the deceleration thereof exceeds a predetermined amount and to re-apply said brake when the angular velocity of said wheel approaches that at which the periphery of said wheel rolls on the road surface without slipping, means for sensing the time for which said brake is relieved and operative, if the sensed time is greater than a predetermined time, to actuate an isolating circuit which renders inoperative said electrical system to permit re-application of said brake, an indicating arrangement including a warning device which is positioned in the vicinity of a driver of the vehicle, said warning device being energized when said electrical system is rendered inoperative, said indicating arrangement also including a bistate switching device connected in series with a relay coil, and a timing circuit connected to said switching device, said switching device being switched to a state in which the relay coil is energized when the ignition of the vehicle is switched on, and being switched to its other state in which the relay coil is de-energized by said timing circuit after said predetermined period of time, and a testing circuit which is actuated automatically when the ignition of the vehicle is switched on to energize said warning device for a predetermined period of time.

6. A fluid pressure operated braking system according to claim 5 wherein said warning device is a lamp.

* * * * *